United States Patent
Schwarzkopf

(12) 
(10) Patent No.: US 6,672,199 B2
(45) Date of Patent: Jan. 6, 2004

(54) CYLINDER BLOCK OF AN AXIAL PISTON COMPRESSOR WITH ELONGATED CYLINDER FACE

(76) Inventor: Otfried Schwarzkopf, Kniebisstrasse 18/1, Magstad (DE), D-81106

( * ) Notice: Subject to any disclaimer, the term of this patent is extended or adjusted under 35 U.S.C. 154(b) by 0 days.

(21) Appl. No.: 09/976,247

(22) Filed: Oct. 12, 2001

(65) Prior Publication Data
US 2002/0056364 A1 May 16, 2002

(30) Foreign Application Priority Data
Oct. 17, 2000 (DE) .......................... 100 51 420

(51) Int. Cl.$^7$ ................................. F04B 27/16
(52) U.S. Cl. ................. 92/71; 92/165 PR; 92/171.1
(58) Field of Search .................. 92/71, 171.1, 165 PR, 92/12.2; 417/269

(56) References Cited

U.S. PATENT DOCUMENTS

| 3,507,584 A | * | 4/1970 | Robbins ............... 92/171.1 |
| 5,129,752 A |   | 7/1992 | Ebbing et al. .......... 92/12.2 |
| 6,212,995 B1 | * | 4/2001 | Hasegawa et al. .......... 92/71 |
| 6,293,182 B1 | * | 9/2001 | Yokomachi et al. ......... 92/71 |

FOREIGN PATENT DOCUMENTS

| DE | 24 15 206 | 5/1977 |
| DE | 196 16 961 | 11/1997 |
| EP | 0 740 076 | 12/1996 |
| EP | 1 004 769 | 5/2000 |

* cited by examiner

Primary Examiner—Edward K. Look
Assistant Examiner—Thomas E. Lazo
(74) Attorney, Agent, or Firm—Andrus, Sceales, Starke & Sawall LLP

(57) ABSTRACT

Cylinder block (32) of an axial piston compressor (20), in particular for use in a vehicle air conditioner with $CO_2$ as coolant, which comprises at least one, in particular several cylinder bores distributed about a periphery, each of which defines a cylinder face and accommodates a piston (8) consisting of piston shaft (8a) and piston neck (8b), wherein the piston neck (8b) outside the cylinder bore serves for coupling to a swash- and/or wobble-plate drive mechanism (29, 33) operatively connected to a rotatable drive shaft (1), by means of which the piston (8) is movable back and forth within the cylinder bore, between a top-dead-center point (OT) and a bottom-dead-center point (UT), and wherein the edge of the opening of the cylinder face on the drive-mechanism side comprises at least one recess (26d) that can be at least partially engaged by a transitional region (8c) disposed between the shaft (8a) and the neck (8b) of the piston, so that the cylinder face effective for the piston (8) is enlarged or elongated.

8 Claims, 5 Drawing Sheets

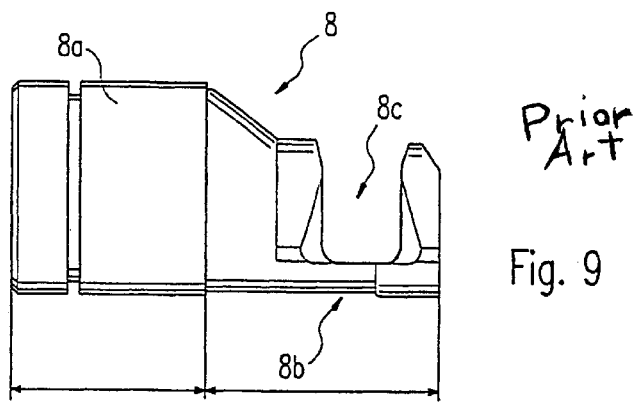
Prior Art
Fig. 9
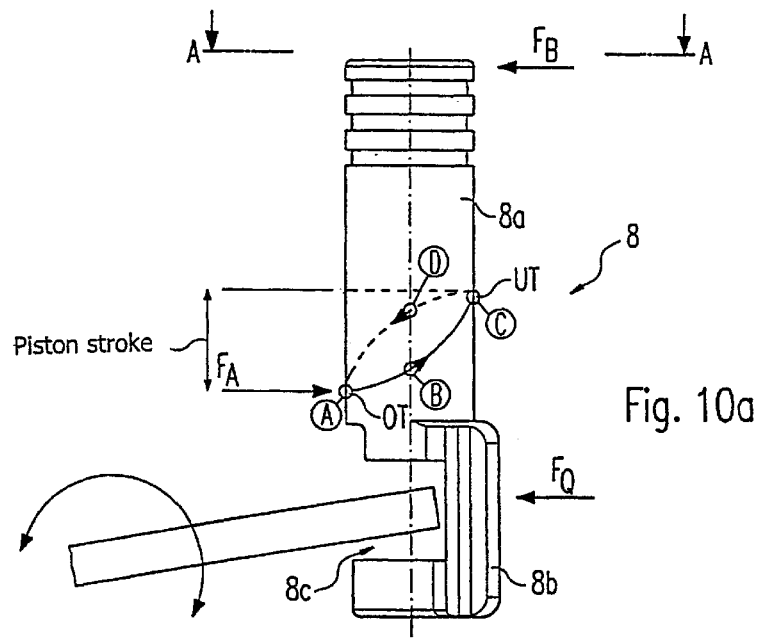
Fig. 10a
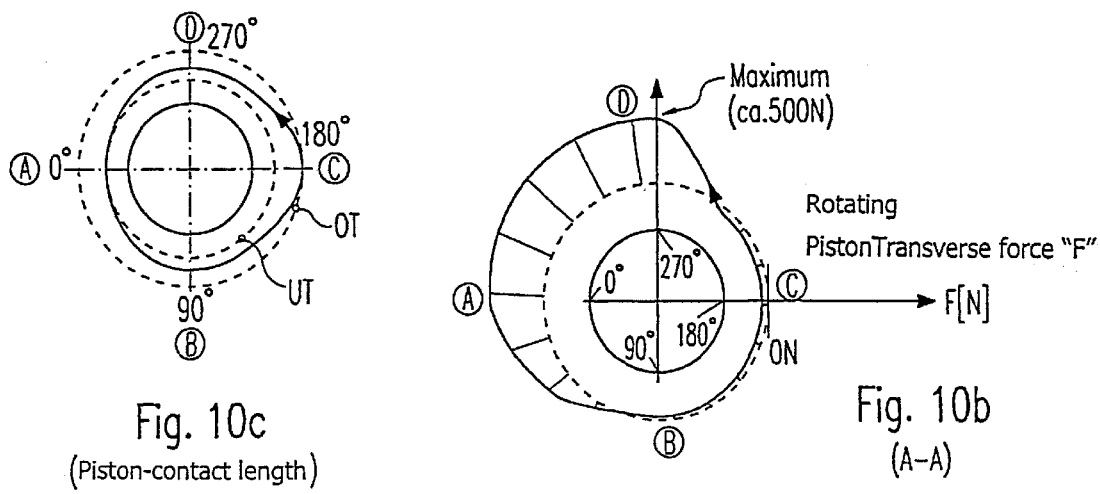
Fig. 10c
(Piston-contact length)
Fig. 10b
(A-A)

CYLINDER BLOCK OF AN AXIAL PISTON COMPRESSOR WITH ELONGATED CYLINDER FACE

CROSS REFERENCE TO RELATED APPLICATION

The present application claims priority from German Patent Application No. 100 51 420.0, filed Oct. 17, 2000.

DESCRIPTION

The invention relates to a cylinder block of an axial piston compressor, in particular for use in a vehicle air conditioner employing $CO_2$ as coolant.

The air conditioners installed in motor vehicles employ coolant compressors of various constructions. In recent years, however, so-called axial piston compressors have become predominant. FIG. 4 shows this kind of axial piston compressor according to the state of the art, in diagrammatic longitudinal section. This is a so-called swash-plate compressor to be used with R134a as the coolant. A compressor shaft 1 is driven by way of a pulley associated with a magnetic coupling 2. A swash plate 3 is coupled to the drive shaft 1. The swash plate 3 is fixedly attached to the drive shaft 1 and rotates therewith. Various forms of linkage are known for mounting and centering the swash plate 3 on the drive shaft 1 in such a way that although the plate cannot rotate with respect to the shaft, it is possible for the axis 3a of the swash plate 3 to be tilted relative to the axis 1a of the drive shaft 1. The tilt angle of the swash plate 3 as a rule is limited to a minimal (3b) and a maximal (3c) value by two stopping devices. Customarily one or two guide pins 4 are needed so that the tilting movement can be carried out in a specified manner, with no risk of the plate becoming jammed during the adjustment. The means of limiting the tilting movement, i.e. the limit stops, can also be integrated into the region of the guide pins 4. In the example shown in FIG. 4, the guide pin is fixedly attached to the swash plate 3 and incorporates a bearing 5a that is movable with respect to a stopping plate 5 and that is responsible for centering the guide pin (see reference numeral 4a in FIG. 4). The stopping plate 5, which is likewise attached to the shaft, is supported by way of an axial bearing 6.

The swash plate is not only adjustable regarding its angle with respect to the drive shaft 1, but can also be shifted axially along the drive shaft 1. This shifting is necessary so that the top-dead-center point of the associated piston 8 can be maintained despite differences in the plate angle. Ordinarily limit stops are provided that prevent the swash plate 3 from being displaced beyond an upper seating 3d and a lower seating 3e on the drive shaft 1. The displacement mechanism is pretensioned to a specified degree by a compression spring 7. The stroke of the piston is determined by the tilt angle of the swash plate 3. When this angle is as large as possible, the stroke is maximal; a minimal tilt angle results in a minimal piston stroke.

The pistons 8 in the embodiment illustrated here are connected to the swash plate 3 by way of hemispherical linkage elements 9, 10. To absorb the tensile-pressure load, above a piston one linkage element 10 is disposed on the lower bearing surface 3g of the swash plate 3 and another linkage element 9 is disposed on its upper bearing surface 3f. By way of their flat surfaces 9a, 10a, the linkage elements run over complementary bearing surfaces of the swash plate 3 at the full circumferential velocity with a radial movement superimposed, with the result that the path of the linkage elements on the swash plate is elliptical. The convex upper surfaces 9b, 10b of the linkage elements are seated in indentations in the piston 8 that have a complementary, hemispherical form; while the compressor is in operation, there is a comparatively small amount of relative movement here. The axial piston compressors described above comprise several pistons distributed about their periphery, customarily three to eight pistons.

FIG. 9 shows a side view of a piston 8 such as is employed in an axial piston compressor like that shown in FIG. 4. The piston 8 consists of two sections, namely a piston shaft 8a and a piston neck 8b. The term "shaft" is used here to designate the part or section of the piston that is disposed within an associated cylinder bore which guides its back-and-forth it movement. The piston neck 8b, which customarily comprises a U-shaped cavity 8c, encloses the above-mentioned swash plate 3 and, in combination with the linkage elements 9, 10, serves to transmit the forces from the swash plate 3 to the piston shaft 8a. The back surface of the piston neck 8b is in contact with the inner surface of the drive-mechanism housing, in such a way that as the piston 8 moves back and forth, it is prevented from rotating within the associated cylinder bore.

FIG. 7 shows a specific way in which this rotational stability is accomplished. Supplementary information is provided in the document EP 0 740 076 A2. In order to limit the rotation of the piston 8 about its long axis, on the side of the piston neck that faces the drive-mechanism housing a convex surface 72 is disposed. Opposite to and spaced somewhat away from this surface is a concave surface in the housing 71. The radius $R_1$ of the convex surface 72 is larger than the radius $R_p$ of the cylindrical outer surface of the piston shaft, but smaller than the radius $R_2$ of the concave inner surface in the housing 71. The contact between the convex surface 72 and the concave surface of the housing 71 limits the extent to which the piston 8 can rotate about its long axis. The dashed line shows that if the piston 8 rotates, only one edge 74 of the convex surface 72 touches the concave inner surface of the housing 71. To reduce friction and avoid wear and tear, it is advisable to treat the surfaces appropriately.

In FIG. 8 an alternative means of guiding the piston longitudinally is illustrated. This alternative construction to prevent unintended rotation of the piston 8 comprises a ridge 82 disposed along the piston shaft, which engages with a corresponding groove 83 in the face of the cylinder bore 81.

The translational movement of the piston 8 in the associated cylinder bore requires the dimensions, shape, position and surface properties of the parts and/or surfaces that correspond to one another to be very close to specifications.

FIGS. 4, 7, 8 and 9 document the classical state of the art insofar as it pertains to the axial piston compressor for a vehicle air conditioner. When R134a is used as the coolant, the piston diameter is about 30 mm. Because $CO_2$ is a distinctly higher-performance coolant, compressers employing $CO_2$ can have a considerably smaller stroke volume. On the other hand, it is necessary to cope with comparatively large pressure differences. That is, when $CO_2$ is used as the coolant, the pressures exerted on the piston 8 are considerably greater. To compensate for these higher pressures, $CO_2$ compressors are provided with pistons of considerably smaller diameter, e.g. about 16 mm.

However, as is illustrated in FIG. 5, when the shaft of a piston has such a small diameter, its neck projects further outward; that is, it is displaced to the side with respect to the long axis of the piston. In the embodiment shown in FIG. 5 the pistons 8 are driven by a wobble plate 29. The wobble plate 29 rests against a swash plate 33 by way of antifriction bearings 30, 28 and 24. By means of an internally threaded fixation disk 31, the wobble plate is fixed so that its axis coincides with that of the swash plate. The pistons are coupled to the wobble plate by way of linkage bearings 27 and 25 and by a set screw 26. The piston 8 consists of a shaft 8a and a neck 8b. These are separated by a transitional region 8c, which connects the shaft to the neck. In the case of an R134a compressor this transitional region is not necessary, because (as shown in FIG. 9) the neck of the piston has a diameter no greater than that of the associated shaft. The pistons 8 shown in FIG. 5 are guided axially in their back-and-forth movement by bores within a cylinder block 32. If the pistons 8 are provided with piston rings, the bearing surface of the cylinder bores either is coated with a layer of particularly wear-resistant material, or there are set into it bushings 26 made of a correspondingly resistant material. As can be seen in FIG. 5, the bushings 26 at the drive-mechanism end of the cylinder are flush with the cylinder block. Accordingly, the transitional region 8c between the shaft and neck of the piston is always outside the bearing surface of the cylinder.

To put it simply, the forces acting on the piston 8 are a transverse force $F_Q$ (introduced by the drive mechanism) and transverse forces $F_A$ and $F_B$, which are also applied to the cylinder bushing 26 (see FIG. 5). One of the factors determining the magnitude of the reactive forces $F_A$ and $F_B$ is the lever-arm ratio B/(B-A).

These transverse forces are plotted in FIG. 6 for one operating point. The lever-arm ratio is also plotted in this graph. The relationships between force and angle shown there must be regarded as qualitative, because they can be shifted or altered in magnitude to a considerable extent at different operating points.

When the drive shaft 1 for the axial piston compressor is at the angular position 0°, in the embodiment illustrated here, the piston 8 has reached its top dead center (OT), the position in which the coolant gas is being expelled from the compression space. As the angle increases, the piston moves towards its bottom dead center (UT), which it reaches when the drive shaft is in the 180° position. At the bottom dead center the pressure in the compression space falls to the suction pressure, at which point traction forces operate. During the further rotation of the drive shaft 1, beyond 180°, the piston is returned to top dead center. In the process, the coolant gas is compressed and subsequently expelled from the compression space. In FIG. 5 the transverse forces are represented as vectors, as mentioned above. FIG. 5 shows the piston at top dead center, at which point the angular position of the drive shaft 1 is 0°. The transverse forces $F_Q$ are of relatively large amplitude in this position and are directed towards the central axis of the compressor. The transverse force $F_Q$ introduces the reactive forces $F_A$ and $F_B$, also shown as vectors in this "snapshot", as a result of a bending moment at the piston 8. During a complete piston movement (OT-UT-OT) the transverse forces make one complete circuit about the piston axis.

The critical region for the drive shaft 1 is in the range of angular positions from 250° to 360°, because in this range the transverse forces are relatively large. This applies in particular to a drive-shaft position of 270°, in which the piston 8 is still pulled relatively far out of the cylinder liner 26. This signifies a particularly large reactive force $F_A$. Accordingly, in this angular position (270°) the pistons 8 are especially exposed to wear. The diagram according to FIG. 6 also makes clear that the pistons, for instance in the angular position 180° (UT), cannot be braced against the wall of the housing because then traction forces would act.

Finally, it is evident from FIG. 5 that if the introduced transverse force $F_Q$ encountered a support directly in the region where it is applied, a bending moment in the piston would be prevented. This would bring enormous advantages with respect to reducing wear and tear.

Accordingly, the objective of the present invention is to create a cylinder block for an axial piston compressor, the cylinder faces of which ensure considerably improved support of transverse forces, in order by this means to increase the working life of the axial piston compressor.

The central idea in the present invention is thus that the edge of the opening of the cylinder face on the drive-mechanism side comprises at least one recess with which a transitional region disposed between the shaft and the neck of the piston can engage, so that the cylinder face effective for the piston is enlarged or lengthened. As a result, the lateral support of the piston against the associated bearing surface in the cylinder bore is considerably improved, with the consequence that there is less wear and the working life of the axial piston compressor is prolonged.

Moreover, in the present invention the fundamental rule applies that the recess in accordance with the invention is in each case disposed at the site that is under the least load. To assist understanding of this basic idea, reference is made to FIGS. 10a to 10c. These drawings show the paths of the transverse forces around the piston and the length of its contact region in the course of a stroke; these two parameters determine the amount of wear and hence also the preferred position of the lengthened cylinder face. At top dead center OT the length of the contact region is maximal, whereas at bottom dead center UT it is minimal. Now if the revolving transverse force is projected onto the contact length, as shown in FIG. 10b, the sequence of priorities for a lengthened support surface for the piston, i.e. a correspondingly lengthened cylinder face, is as follows: D, A, B. C. That is, in position C the load is least, and hence this is the preferred position for construction of a recess in accordance with the invention. The position C is radially external to the longitudinal middle axis of the axial piston compressor and of the swash or wobble plate associated with the piston 8; that is, it is next to the inside of the drive-mechanism housing. At this juncture it should once again be mentioned that FIG. 10a leaves open the direction in which the swash or wobble plate rotates. Depending on the direction of rotation of the swash or wobble plate, of course, there will be a mirror-image reversal of the paths about the X (horizontal) axis shown in FIGS. 10b and 10c.

The first alternative is characterized by the fact that the surface of the cylinder bore is worked; i.e., there is no separate liner or similar component. Accordingly, in this embodiment the above-mentioned recess must be formed within the cylinder bore, at the edge of the opening on the drive-mechanism side.

The second alternative is characterized by the insertion into the at least one cylinder bore of a liner that projects from the cylinder bore on the drive-mechanism side and in this region is provided with the above-mentioned recess.

The third alternative is characterized in that, again, a liner is inserted into the at least one cylinder bore, but in this case its edge is flush with the opening of the cylinder bore on the drive-mechanism side. In this case the recess in accordance with the invention must be formed in both the cylinder bore and the associated liner, at the edge of the opening on the drive-mechanism side.

As can be discerned from the above explanations in combination with FIGS. 10a to 10c, the recess in accordance with the invention is situated in a region in which the transverse forces acting on the piston are weakest. This region is ordinarily in the position on the side of the piston opposite the coupling to the drive mechanism, i.e. the side next to the wall of the drive-mechanism housing.

Preferably the neck of the piston is also laterally supported against the drive-mechanism housing. The lateral support here is brought about by a guide pin, a feather key or a similar means of longitudinal guidance. Models for this are available in the state of the art.

Preferably the edge of the opening of the cylinder face on the drive-mechanism side is beveled or rounded, to facilitate installation of the piston and reduce wear on the piston as it moves past the edge.

The recess in accordance with the invention preferably extends over an angular region of about 80° to about 160°, in particular about 120°.

In the following the invention is described with reference to exemplary embodiments, shown in greater detail in the attached drawings, wherein FIG. 1a is a cross-section of a cylinder block for an axial piston compressor constructed in accordance with the invention;

FIG. 1b is a view along the line A—A of FIG. 1a;

Figure 2:
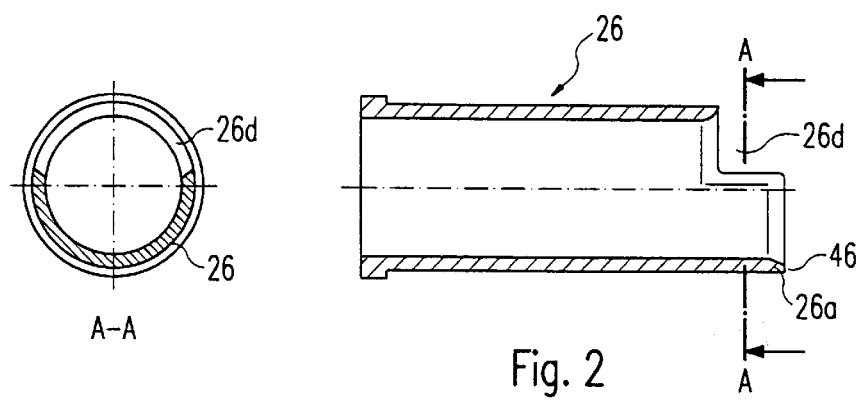
FIG. 2 is a side cross-sectional view of the cylinder liner utilized in the present invention.
Figure 3:
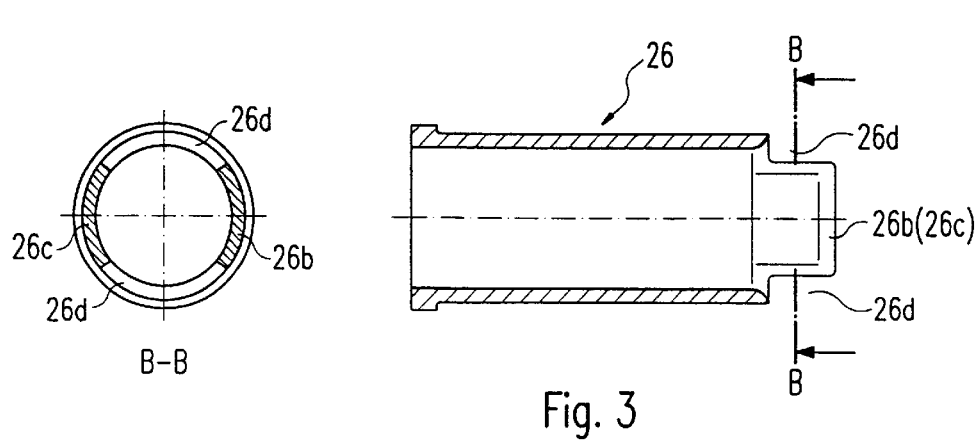
Figure 4:
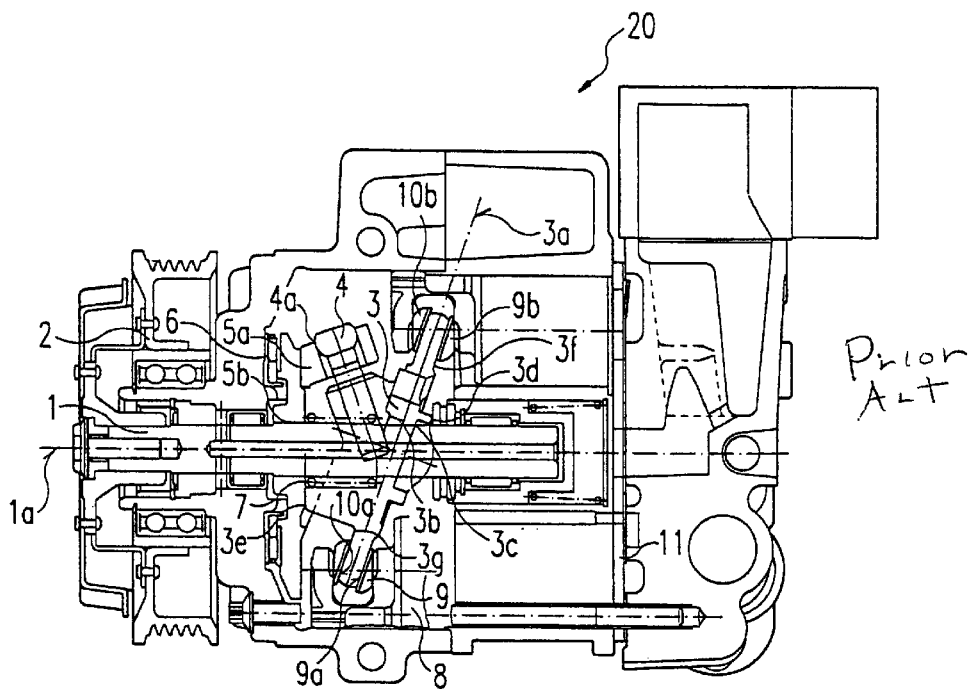
Figure 5:
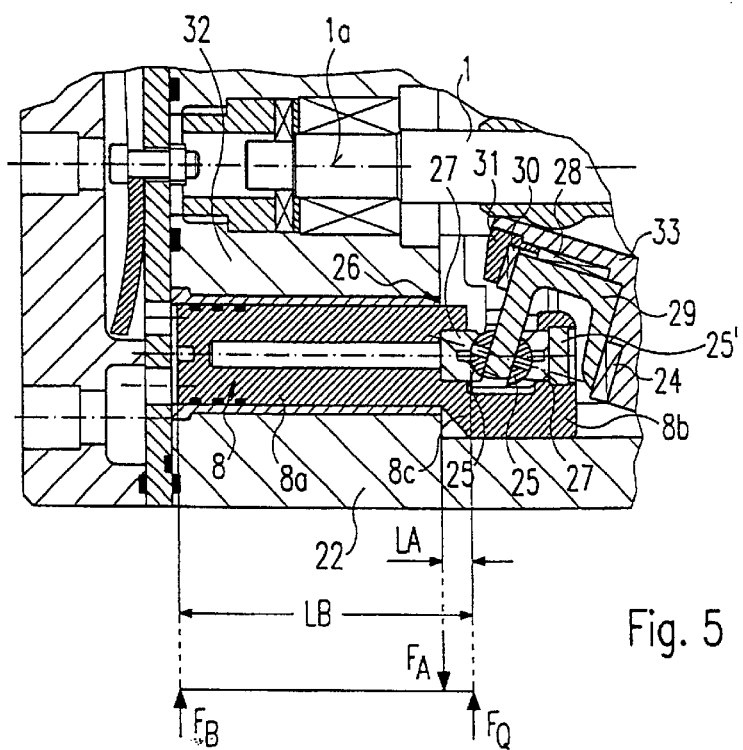
Figure 6:
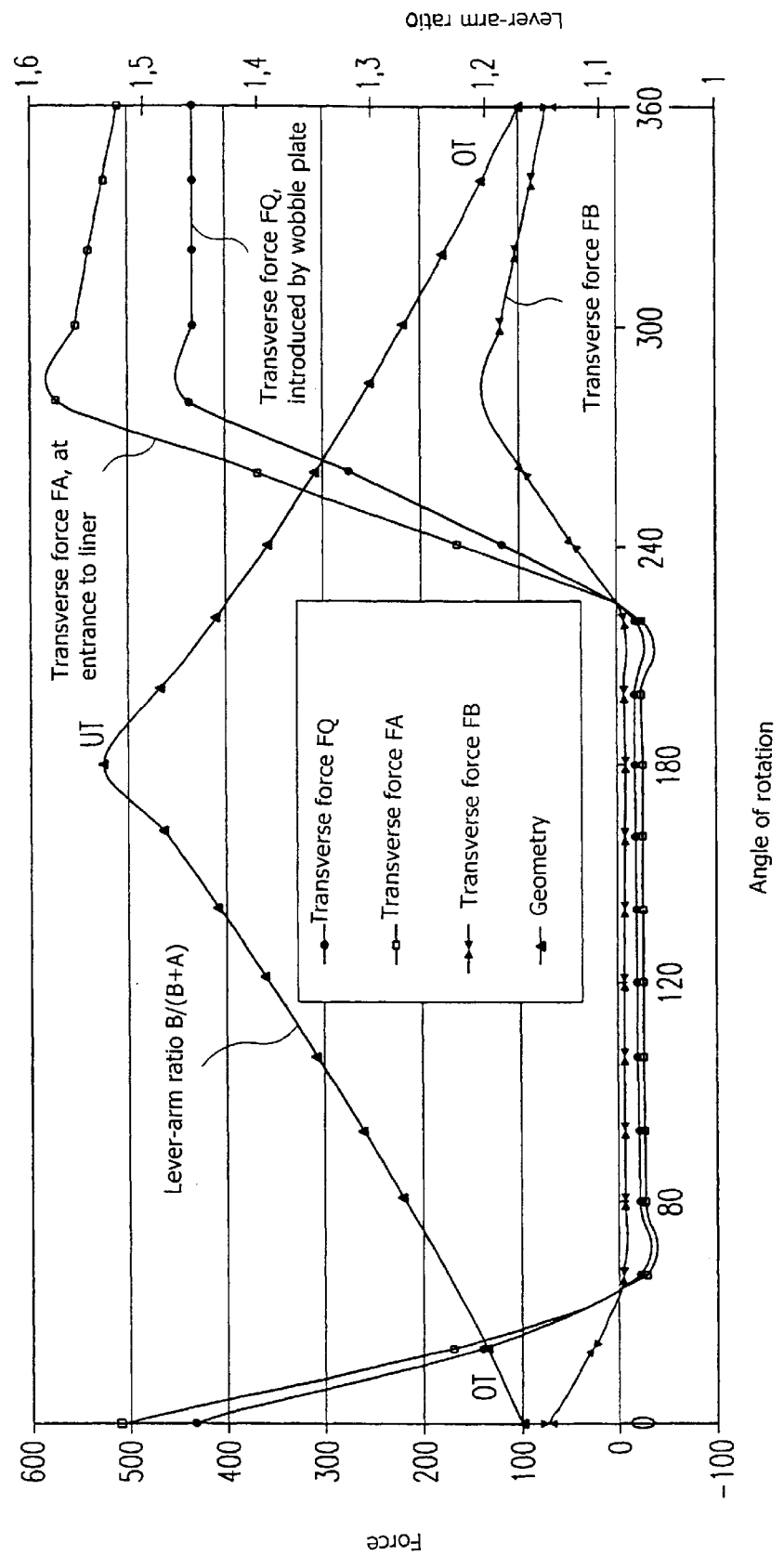
Figure 7:
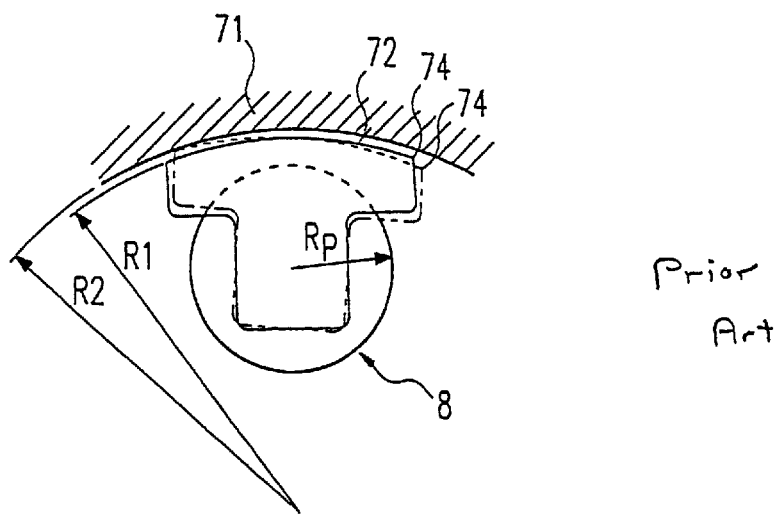
Figure 8:
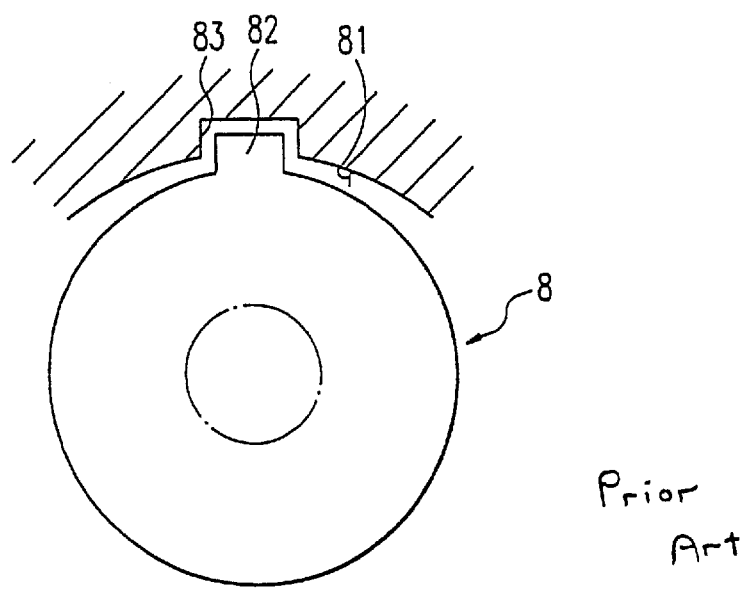

FIG. A—A is a view along the line A—A of FIG. 2;

FIG. 3 is a side cross-sectional view of an alternate embodiment of the cylinder liner of FIG. 2 and FIG. B—B is a view along the line B—B of FIG. 3;

FIG. 4 is a side cross-sectional view of a prior art axial piston compressor;

FIG. 5 is a side cross-sectional view of the cylinder block of FIG. 1 illustrating the driving of the pistons by a wobble plate;

FIG. 6 is a graph illustrating the transverse forces acting on a piston;

FIG. 7 shows a prior art axial piston compressor;

FIG. 8 shows a prior art axial piston compressor;

FIG. 9 is a side view of a prior art axial piston compressor; and

FIGS. 10a through 10c illustrate the position of the piston recess and the transverse forces acting on the piston.

The parts that this embodiment has in common with the arrangement according to FIG. 5 are identified by the same reference numerals and are not further discussed here.

Figures 1A, 1B:
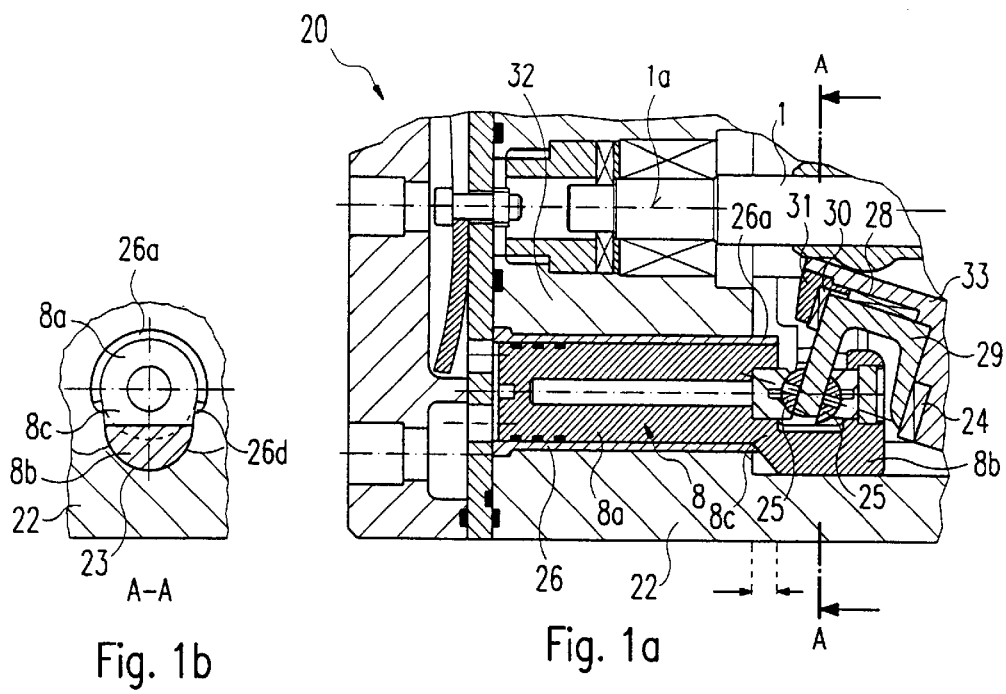

The embodiment according to FIGS. 1a, 1b is distinguished by a cylinder liner 26 inserted in a cylinder bore and especially shrunk, which on the drive-mechanism side projects beyond the opening in the cylinder block 32. This projecting part of the cylinder liner 26 is identified in FIGS. 1a and 1b by the reference numeral 26a. In this regard reference is also made to FIG. 2, which shows the cylinder liner 26 according to FIGS. 1a, 1b in longitudinal section as well as in cross section along the line A—A, on a larger scale.

In order to prevent the transitional region 8c, between the shaft 8a and neck 8b of the piston, from colliding with the part of the cylinder liner 26 that projects out of the cylinder bore on the drive-mechanism side, in the region of the transition 8c the projecting part 26a of the cylinder liner is cut away to form a recess 26d, which extends over an angular region of about 120° (see section A—A in FIG. 2 and section A—A in FIG. 1b).

The cylinder face within the cylinder liner 26 on the side that primarily supports the piston is correspondingly lengthened by the section 26a. The side of the piston on which the transitional region 8c is situated bears essentially no load, so that no potential problems are created by forming the recess 26d in this region.

It can be seen in FIG. 1b that the back of the piston collar 8b is supported against the inside of the wall of the drive-mechanism housing, in such a way that at the same time the piston 8 is guided longitudinally at its sides. For this purpose the back of the piston neck 8b is so shaped as to have an approximately hemispherical cross section. On the inner surface of the drive-mechanism housing wall a longitudinal groove 23 with a corresponding, complementary shape is formed (see FIG. 1b).

The wall of the drive-mechanism housing is identified in FIGS. 1a and 1b, as in FIG. 5, by the reference numeral 22.

As a rule, the longitudinal guide means for the piston in the region of the piston neck 8b, as shown in FIG. 1b, is sufficient. If this is not the case, additional guide elements such as feather keys, guide pins or the like can also be provided. Because these are generally employed in mechanical engineering, there is no need to describe and illustrate them in detail for the present case.

FIG. 2 shows in addition that the edge of the cylinder liner 26 on the drive-mechanism side is rounded, for the reasons cited above.

In FIG. 3 an alternative embodiment of a cylinder liner 26 in accordance with the invention is shown having two recesses 26d disposed opposite one another. This embodiment is particularly appropriate when it is a matter of supporting transverse forces in a primarily horizontal direction.

Here, again, the edge of the cylinder liner on the drive-mechanism side is rounded or beveled. This rounding or beveling facilitates the installation of pistons in the cylinder liner. Furthermore, the amount of wear on the piston as it moves past that edge is diminished (radius reduces the surface pressure).

As a result of the measures described above, the transverse forces acting on the piston are better tolerated, in a manner suitable for the particular requirements, with respect to magnitude and direction of the forces. Because the cylinder face is elongated, the moment of tilt of the piston is reduced. The lever-arm ratio is improved, so that less load is imposed on the cylinder face. Another consequence of the reduction of transverse forces is that the friction between piston shaft and cylinder face, and hence also the amount of wear, is correspondingly reduced. If it proves necessary to provide the cylinder face with a coating, this can be done more easily. In particular, the smaller risk of wear is associated with less need to apply a lubricant, and such lubricant as is needed can be more simply applied by way of the recess provided in the cylinder face in accordance with the invention.

The cylinder liner described here is intended preferably for use in an axial piston compressor that operates with a high-pressure coolant, in particular $CO_2$. In this case the piston diameter and hence the diameter of the cylinder bore d=14–17 mm. The piston stroke in this embodiment covers about s=24–17 mm. Therefore the ratio d/s is $\leq 1$.

It has further been found that with this embodiment, the described recess can have an axial extent of 3–6 mm.

When more than one recess is provided, for instance as in the embodiment according to FIG. 3, the axial extent of the recesses can differ. This will ultimately depend on external structural considerations.

All the characteristics disclosed in the application documents are claimed as essential to the invention insofar as they are new to the state of the art individually or in combination.

What is claimed is:

1. A cylinder block (32) of an axial piston compressor (20) for use in a vehicle air conditioner that utilizes $CO_2$ as a coolant comprising,
    at least one cylinder bore disposed in the block, said cylinder bore having an opening defined by a bore edge,
    a cylinder bore liner disposed within said bore and extending outwardly from said opening,
    a piston disposed in said cylinder bore, said piston comprising:
        a shaft disposed within said bore,
        a neck disposed outside of said bore with said neck being operatively connected to a swash/wobble plate drive mechanism and having an enlarged radial portion extending beyond the diameter of said bore and
        a transitional portion connecting said shaft to said neck and
    said liner having a recessed edge portion engageable by said transitional portion.

2. The cylinder block of claim 1 wherein both of said bore edge and said liner edge include a recessed portion engageable by said transitional portion.

3. The cylinder block of claim 1 wherein said recessed portion is disposed in an area in which the transverse force acting on said piston is at a minimum.

4. The cylinder block of claim 1 wherein said recessed edge portion is disposed on said bore opposite the side of said piston operatively connected to said drive mechanism.

5. The cylinder block of claim 1 wherein said recessed portion extends over an angular region between 80° and 160°.

6. The cylinder block of claim 1 wherein said recessed portion extends over an angular region of 120°.

7. The cylinder block of claim 1 wherein said liner includes a beveled outer edge.

8. The cylinder block of claim 1 wherein said liner is provided with a pair of recesses disposed diametrically opposite each other.

* * * * *